US012619935B2

(12) United States Patent
Pande et al.

(10) Patent No.: US 12,619,935 B2
(45) Date of Patent: May 5, 2026

(54) SYSTEMS AND METHODS FOR SYSTEM COLLUSION DETECTION

(71) Applicant: Walmart Apollo, LLC, Bentonville, AR (US)

(72) Inventors: Kirti Pande, San Jose, CA (US); Jing Xia, Dublin, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 203 days.

(21) Appl. No.: 18/428,224

(22) Filed: Jan. 31, 2024

(65) Prior Publication Data

US 2025/0247394 A1      Jul. 31, 2025

(51) Int. Cl.
*G06Q 10/0635* (2023.01)
*G06F 21/62* (2013.01)
(Continued)

(52) U.S. Cl.
CPC ..... *G06Q 10/0635* (2013.01); *G06F 21/6263* (2013.01); *H04L 41/16* (2013.01); *H04L 63/102* (2013.01); *H04L 63/1425* (2013.01)

(58) Field of Classification Search
CPC .. G06Q 10/0635; G06N 20/00; G06F 18/285; G06F 9/542; G06F 18/251;
(Continued)

(56) References Cited

U.S. PATENT DOCUMENTS

2011/0313965 A1    12/2011  Madhok et al.
2018/0158062 A1     6/2018  Kohli
(Continued)

FOREIGN PATENT DOCUMENTS

CN            113591932  A  *  11/2021  .........  G06F 18/2433
WO    WO-2019079071  A1  *  4/2019  ...........  G06F 18/285

OTHER PUBLICATIONS

H2O.ai, "Collusion Fraud—Financial Services Use Cases," https://h2o.ai/solutions/use-case/collusion-fraud/, Downloaded from Internet Nov. 22, 2023, 3 pages.
(Continued)

*Primary Examiner* — Kyung H Shin
(74) *Attorney, Agent, or Firm* — Morgan, Lewis & Bockius LLP; Manita Rawat

(57) ABSTRACT

Systems and methods of generating fraud detection models and controlling network permissions of one or more systems within a network environment are disclosed. A network activity dataset comprising data representative of network activity within a network environment is received and at least one co-controlled system in the network activity dataset is identified by implementing a trained fraud detection model configured to receive the network activity dataset and output a fraud determination for each system having at least a first role in the network activity data. The fraud determination represents a likelihood of a system having the first role engaging in a co-controlled network activity. In response to identifying the at least one co-controlled system, one or more permissions of the at least one co-controlled system for operating within the network environment are modified.

20 Claims, 11 Drawing Sheets

(51) Int. Cl.
 *H04L 9/40* (2022.01)
 *H04L 41/16* (2022.01)
(58) Field of Classification Search
 CPC  G06F 9/44526; H04N 21/84; H04N 21/4788;
  H04N 21/23418; H04L 67/10; H04L
  63/102; H04L 41/16; H04L 63/1425
 See application file for complete search history.

(56) References Cited

U.S. PATENT DOCUMENTS

| | | | |
|---|---|---|---|
| 2022/0129787 A1* | 4/2022 | Vogeti | G06F 8/60 |
| 2024/0086577 A1* | 3/2024 | Zhang | G06F 21/6263 |
| 2024/0095637 A1* | 3/2024 | Holovacs | G06Q 10/0635 |
| 2025/0117797 A1* | 4/2025 | Ruan | G06N 5/045 |

OTHER PUBLICATIONS

H2O.ai, "Driving Away Fraudsters at PayPal," https://h2o.ai/content/dam/h2o/en/marketing/documents/2020/01/PayPal-Customer-Case-Study-rnd2-1.pdf, Jan. 22, 2020, 2 pages.
Uber Technologies Inc., "Fraud Detection: Using Relational Graph Learning to Detect Collusion," May 21, 2021, 15 pages.

* cited by examiner

200

Receive Model Generation Request
402

Generate Training Dataset
404

Iteratively Train Model Framework
406

Output Trained Fraud Detection Model
408

SYSTEMS AND METHODS FOR SYSTEM COLLUSION DETECTION

TECHNICAL FIELD

This application relates generally to detecting co-controlled systems in network environments, and more particularly, to detecting co-controlled systems engaging in fraudulent behavior within a monitored network environment.

BACKGROUND

Operation of some network environments is based on, or assumes, that certain network users are unrelated. For example, certain network operations that organize or present content, such as content in response to search queries or other browsing, assume that network activity being used to drive such organization is based on unrelated parties operating within the network environment. When related actors (e.g., same entity operating as a first user and a second user, two communicating entities operating within the network environment, etc.) operate within a network environment, the co-controlled operations can intentionally or accidentally cause incorrect operation of other network systems or processes.

Co-controlled network interactions can also result in fraudulent operation of a network environment. For example, when related actors attempt to game a system, the related operations may result in fraud such as, in the context of an ecommerce network environment, payment fraud, return abuse, fake reviews, price gauging, etc. Current systems are not capable of adequately detecting co-controlled operation of third-party systems.

SUMMARY

In various embodiments, a system include a non-transitory memory and a processor communicatively coupled to the non-transitory memory is disclosed. The processor is configured to read a set of instructions to receive a network activity dataset including data representative of network activity within a network environment, identify at least one co-controlled system in the network activity dataset by implementing a trained fraud detection model configured to receive the network activity dataset and output a fraud determination for each system having at least a first role in the network activity data, and, in response to identifying the at least one co-controlled system, modify one or more permissions of the at least one co-controlled system for operating within the network environment.

In various embodiments, a computer-implemented method is disclosed. The computer-implemented method includes steps of receiving a network activity dataset comprising data representative of network activity within a network environment, identifying at least one co-controlled system in the network activity dataset by implementing a trained fraud detection model configured to receive the network activity dataset and output a fraud determination for each system having at least a first role in the network activity data, and, in response to identifying the at least one co-controlled system, modifying one or more permissions of the at least one co-controlled system for operating within the network environment.

In various embodiments, a non-transitory computer readable medium having instructions stored thereon is disclosed. The instructions, when executed by at least one processor, cause at least one device to perform operations including training a fraud detection model to receive an input dataset representative of network activity and output a fraud determination for each system having at least a first role in the network activity data, receiving a network activity dataset for a network environment, identifying at least one co-controlled system in the network activity dataset by providing network activity dataset to the trained fraud detection model and generating the fraud determination for each system in the network activity dataset, and, in response to identifying the at least one co-controlled system, modifying one or more permissions of the at least one co-controlled system for operating within the network environment. The network activity dataset includes at least one feature representative of a time period for one or more corresponding activities. The trained fraud detection model is configured to apply a first threshold for classification of each system for a first time period and a second threshold for classification of each system for a second time period. The output of the trained fraud detection model is representative of a predicted likelihood of each system engaging in one of a plurality of co-controlled activities.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
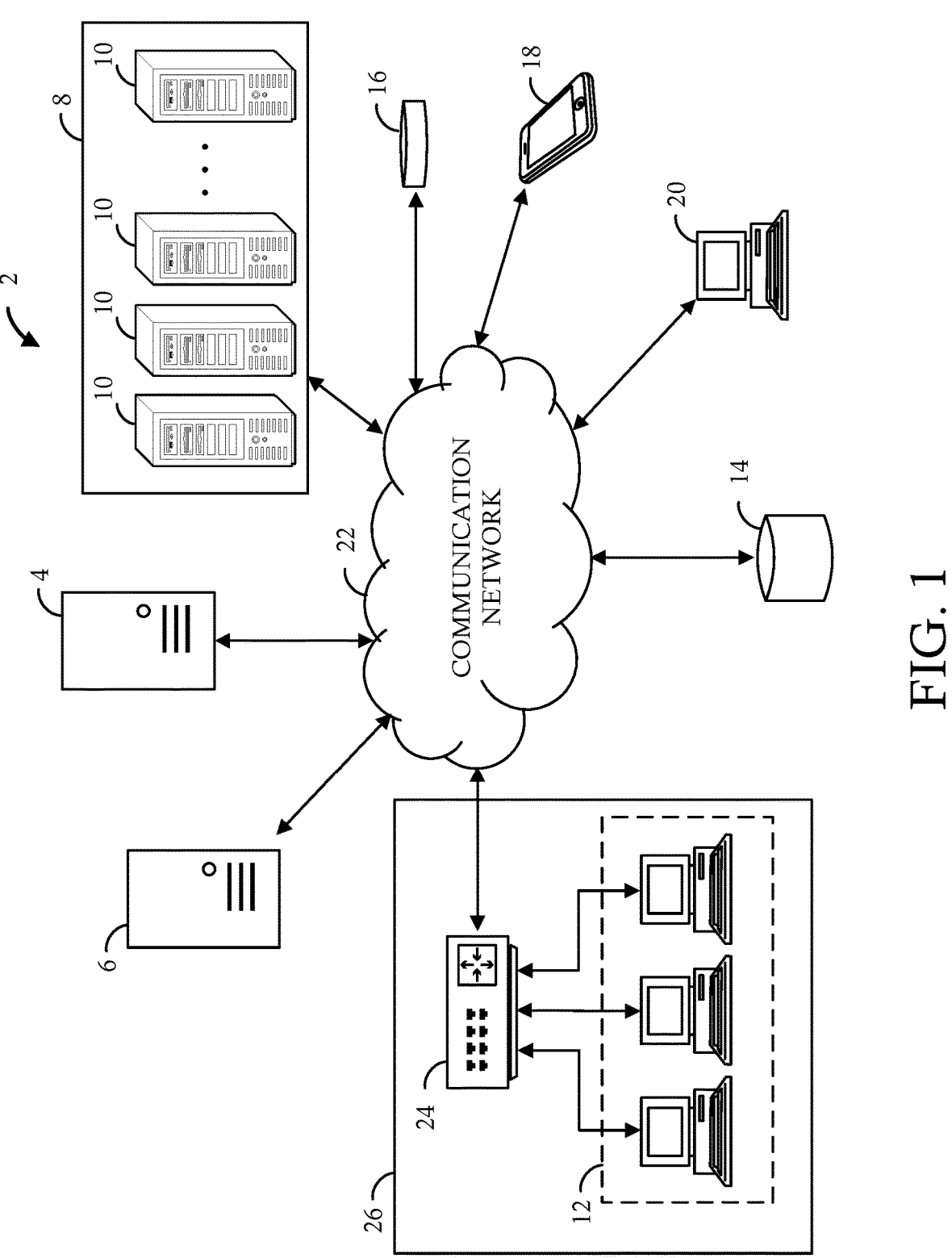
FIG. 1 illustrates a network environment configured to provide network fraud detection, in accordance with some embodiments.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically connected (e.g., wired, wireless, etc.) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

Furthermore, in the following, various embodiments are described with respect to methods and systems for network fraud detection. In various embodiments, a trained fraud detection model predicts a likelihood that a target system is engaged in co-controlled interactions and/or operations within a network environment. The trained fraud detection model may be configured to receive an input dataset including network data representative of one or more interactions and/or operations including at least one target system and at least one secondary system. The network data may include, but is not limited to, digital identity features for the at least one target system and/or the at least one secondary system, transactional behaviors for one or more interactions and/or operations within the network environment, time features representative of a time period for a corresponding interaction and/or operation, etc.

In some embodiments, systems and methods for network fraud detection include one or more trained fraud detection models. The trained fraud detection models may include one or more models, such as one or more multiclass classification models. A trained fraud detection model may be generated by a supervised learning process utilizing a training dataset including labeled interactions (e.g., transactions, operations, communications, etc.) occurring within a network environment. In some embodiments, a multiclass classification model may be configured to apply two or more thresholds to classify input datasets for two or more predefined time periods.

In general, a trained function mimics cognitive functions that humans associate with other human minds. In particular, by training based on training data the trained function is able to adapt to new circumstances and to detect and extrapolate patterns.

In general, parameters of a trained function may be adapted by means of training. In particular, a combination of supervised training, semi-supervised training, unsupervised training, reinforcement learning and/or active learning may be used. Furthermore, representation learning (an alternative term is "feature learning") may be used. In particular, the parameters of the trained functions may be adapted iteratively by several steps of training.

In some embodiments, a trained function may include a neural network, a support vector machine, a decision tree, a Bayesian network, a clustering network, Qlearning, genetic algorithms and/or association rules, and/or any other suitable artificial intelligence architecture. In some embodiments, a neural network may be a deep neural network, a convolutional neural network, a convolutional deep neural network, etc. Furthermore, a neural network may be an adversarial network, a deep adversarial network, a generative adversarial network, etc.

In various embodiments, neural networks which are trained (e.g., configured or adapted) to generate a probability of one or more predetermined network behaviors based on potential co-controlled interactions between two or more systems, are disclosed. A neural network trained to generate a probability of one or more predetermined network behaviors based on potential co-controlled interactions between two or more systems may be referred to as a trained fraud detection model.

FIG. 1 illustrates a network environment 2 configured to provide network fraud detection, in accordance with some embodiments. The network environment 2 includes a plurality of devices or systems configured to communicate over one or more network channels, illustrated as a network cloud 22. For example, in various embodiments, the network environment 2 may include, but is not limited to, a fraud detection computing device 4, a web server 6, a cloud-based engine 8 including one or more processing devices 10, workstation(s) 12, a database 14, and/or one or more user computing devices 16, 18, 20 operatively coupled over the network 22. The fraud detection computing device 4, the web server 6, the processing device(s) 10, the workstation(s) 12, and/or the user computing devices 16, 18, 20 may each be a suitable computing device that includes any hardware or hardware and software combination for processing and handling information. For example, each computing device may include, but is not limited to, one or more processors, one or more field-programmable gate arrays (FPGAs), one or more application-specific integrated circuits (ASICs), one or more state machines, digital circuitry, and/or any other suitable circuitry. In addition, each computing device may transmit and receive data over the communication network 22.

In some embodiments, each of the fraud detection computing device 4 and the processing device(s) 10 may be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodiments, execute one or more virtual machines. In some embodiments, processing resources (e.g., capabilities) of the one or more processing devices 10 are offered as a cloud-based service (e.g., cloud computing). For example, the cloud-based engine 8 may offer computing and storage resources of the one or more processing devices 10 to the fraud detection computing device 4.

In some embodiments, each of the user computing devices 16, 18, 20 may be a cellular phone, a smart phone, a tablet, a personal assistant device, a voice assistant device, a digital assistant, a laptop, a computer, or any other suitable device. In some embodiments, the web server 6 hosts one or more network environments, such as an e-commerce network environment. In some embodiments, the fraud detection computing device 4, the processing devices 10, and/or the web server 6 are operated by the network environment provider, and the user computing devices 16, 18, 20 are operated by users of the network environment (e.g., third-party users). In some embodiments, the processing devices 10 are operated by a third party (e.g., a cloud-computing provider).

The workstation(s) 12 are operably coupled to the communication network 22 via a router (or switch) 24. The workstation(s) 12 and/or the router 24 may be located at a physical location 26 remote from the fraud detection computing device 4, for example. The workstation(s) 12 may communicate with the fraud detection computing device 4 over the communication network 22. The workstation(s) 12 may send data to, and receive data from, the fraud detection computing device 4. For example, the workstation(s) 12 may transmit data related to tracked operations performed at the physical location 26 to fraud detection computing device 4.

Although FIG. 1 illustrates three user computing devices 16, 18, 20, the network environment 2 may include any number of user computing devices 16, 18, 20. Similarly, the network environment 2 may include any number of the fraud detection computing device 4, the web server 6, the processing devices 10, the workstation(s) 12, and/or the databases 14. It will further be appreciated that additional systems, servers, storage mechanism, etc. may be included within the network environment 2. In addition, although embodiments are illustrated herein having individual, discrete systems, it will be appreciated that, in some embodiments, one or more systems may be combined into a single logical and/or physical system. For example, in various embodiments, one or more of the fraud detection computing device 4, the web server 6, the workstation(s) 12, the database 14, and/or the router 24 may be combined into a single logical and/or physical system. Similarly, although embodiments are illustrated having a single instance of each device or system, it will be appreciated that additional instances of a device may be implemented within the network environment 2. In some embodiments, two or more systems may be operated on shared hardware in which each system operates as a separate, discrete system utilizing the shared hardware, for example, according to one or more virtualization schemes.

The communication network 22 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 may provide access to, for example, the Internet.

Each of the user computing devices 16, 18, 20 may communicate with the web server 6 over the communication network 22. For example, each of the user computing devices 16, 18, 20 may be operable to view, access, and interact with a website, such as an e-commerce website, hosted by the web server 6. The web server 6 may transmit user session data related to a system's activity (e.g., interactions) on the website. For example, a user may operate one of the user computing devices 16, 18, 20 to initiate a web browser that is directed to the website hosted by the web server 6. The user computing device 16, 18, 20 may, via the web browser, perform various operations such as searching one or more databases or catalogs associated with the displayed website, view item data for elements associated with and displayed on the website, upload items to the database or catalog, click on interface elements presented via the website, for example, in the search results, etc. The website may capture these activities as user session data, and transmit the user session data to the fraud detection computing device 4 over the communication network 22.

In some embodiments, the fraud detection computing device 4 may execute one or more models, processes, or algorithms, such as a machine learning model, deep learning model, statistical model, etc., to detect co-controlled systems within a network. The fraud detection computing device 4 is further operable to communicate with the database 14 over the communication network 22. For example, the fraud detection computing device 4 may store data to, and read data from, the database 14. The database 14 may be a remote storage device, such as a cloud-based server, a disk (e.g., a hard disk), a memory device on another application server, a networked computer, or any other suitable remote storage. Although shown remote to the fraud detection computing device 4, in some embodiments, the database 14 may be a local storage device, such as a hard drive, a non-volatile memory, or a USB stick. The fraud detection computing device 4 may store interaction data received from the web server 6 in the database 14. The fraud detection computing device 4 may also receive from the web server 6 user session data identifying events associated with browsing sessions, and may store the user session data in the database 14.

In some embodiments, the fraud detection computing device 4 generates training data for a plurality of models (e.g., machine learning models, deep learning models, statistical models, algorithms, etc.) based on aggregation data, historical user session data, search data, purchase data, catalog data, etc. The fraud detection computing device 4 and/or one or more of the processing devices 10 may train one or more models based on corresponding training data. The fraud detection computing device 4 may store the models in a database, such as in the database 14 (e.g., a cloud storage database).

The models, when executed by the fraud detection computing device 4, allow the fraud detection computing device 4 to predict a likelihood of a specific network activity based on a preselected set of inputs. For example, the fraud detection computing device 4 may obtain one or more models from the database 14. The fraud detection computing device 4 may then receive, in from the web server 6, session data for two or more systems utilizing a network environment including and/or provided by the web server 6. In response to receiving session data, the fraud detection computing device 4 may execute one or more models to predict a likelihood of a specific network activity based on a preselected set of inputs.

In some embodiments, the fraud detection computing device 4 assigns the models (or parts thereof) for execution to one or more processing devices 10. For example, each model may be assigned to a virtual machine hosted by a processing device 10. The virtual machine may cause the models or parts thereof to execute on one or more processing units such as GPUs. In some embodiments, the virtual machines assign each model (or part thereof) among a plurality of processing units. Based on the output of the models, fraud detection computing device 4 may generate probabilities of undesirable, predetermined network activities as a result of co-controlled interactions between systems.

Figure 2:
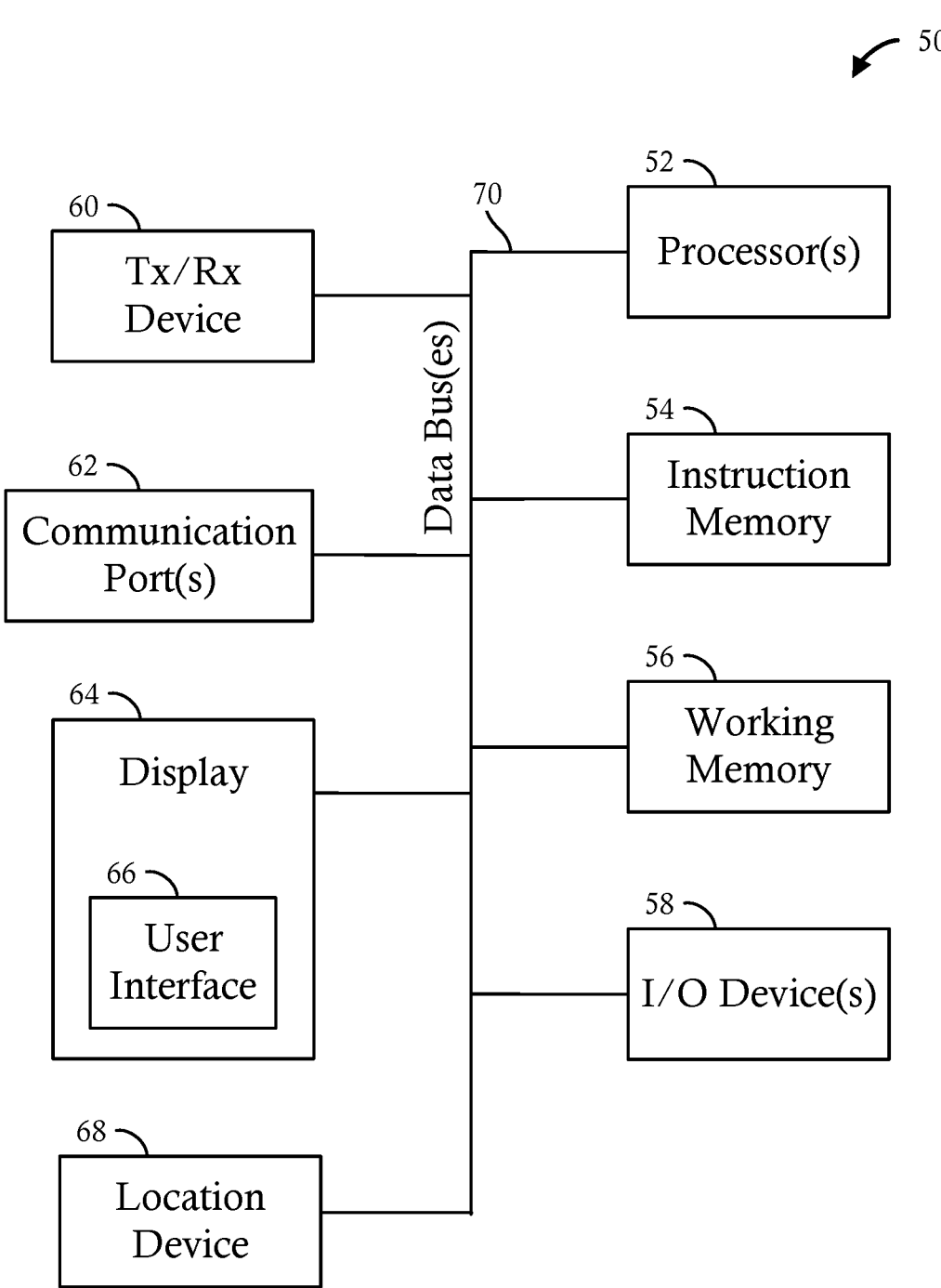
FIG. 2 illustrates a computer system configured to implement one or more processes, in accordance with some embodiments.

FIG. 2 illustrates a block diagram of a computing device 50, in accordance with some embodiments. In some embodiments, each of the fraud detection computing device 4, the web server 6, the one or more processing devices 10, the workstation(s) 12, and/or the user computing devices 16, 18, 20 in FIG. 1 may include the features shown in FIG. 2.

Although FIG. 2 is described with respect to certain components shown therein, it will be appreciated that the elements of the computing device 50 may be combined, omitted, and/or replicated. In addition, it will be appreciated that additional elements other than those illustrated in FIG. 2 may be added to the computing device.

As shown in FIG. 2, the computing device 50 may include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses 70. The data buses 70 allow for communication among the various components. The data buses 70 may include wired, or wireless, communication channels.

The one or more processors 52 may include any processing circuitry operable to control operations of the computing device 50. In some embodiments, the one or more processors 52 include one or more distinct processors, each having one or more cores (e.g., processing circuits). Each of the distinct processors may have the same or different structure. The one or more processors 52 may include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 54 may store instructions that are accessed (e.g., read) and executed by at least one of the one or more processors 52. For example, the instruction memory 54 may be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 may be configured to perform a certain function or operation by executing code, stored on the instruction memory 54, embodying the function or operation. For example, the one or more processors 52 may be configured to execute code stored in the instruction memory 54 to perform one or more of any function, method, or operation disclosed herein.

Additionally, the one or more processors 52 may store data to, and read data from, the working memory 56. For example, the one or more processors 52 may store a working set of instructions to the working memory 56, such as instructions loaded from the instruction memory 54. The one or more processors 52 may also use the working memory 56 to store dynamic data created during one or more operations. The working memory 56 may include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 may include a single memory unit configured to operate as both instruction memory and working memory. Further, although embodiments are discussed herein including non-volatile memory, it will be appreciated that computing device 50 may include volatile memory components in addition to at least one non-volatile memory component.

In some embodiments, the instruction memory 54 and/or the working memory 56 includes an instruction set, in the form of a file for executing various methods, such as methods for network fraud detection, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 52.

The input-output devices 58 may include any suitable device that allows for data input or output. For example, the input-output devices 58 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 1. For example, if the communication network 22 of FIG. 1 is a cellular network, the transceiver 60 is configured to allow communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 1, via the transceiver 60.

The communication port(s) 62 may include any suitable hardware, software, and/or combination of hardware and software that is capable of coupling the computing device 50 to one or more networks and/or additional devices. The communication port(s) 62 may be arranged to operate with any suitable technique for controlling information signals using a desired set of communications protocols, services, or operating procedures. The communication port(s) 62 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or downloading) of data, such as machine learning model training data.

In some embodiments, the communication port(s) 62 are configured to couple the computing device 50 to a network. The network may include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 60 and/or the communication port(s) 62 are configured to utilize one or more communication protocols. Examples of wired protocols may include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 may be any suitable display, and may display the user interface 66. For example, the user interface 66 may be a user interface for an application of a network environment operator that allows a user to view and interact with the operator's website. In some embodiments, a user may interact with the user interface 66 by engaging the input-output devices 58. In some embodiments, the display 64 may be a touchscreen, where the user interface 66 is displayed on the touchscreen.

The display 64 may include a screen such as, for example, a Liquid Crystal Display (LCD) screen, a light-emitting diode (LED) screen, an organic LED (OLED) screen, a movable display, a projection, etc. In some embodiments, the display 64 may include a coder/decoder, also known as Codecs, to convert digital media data into analog signals. For example, the visual peripheral output device may include video Codecs, audio Codecs, or any other suitable type of Codec.

The optional location device 68 may be communicatively coupled to a location network and operable to receive position data from the location network. For example, in some embodiments, the location device 68 includes a GPS device configured to receive position data identifying a latitude and longitude from one or more satellites of a GPS constellation. As another example, in some embodiments, the location device 68 is a cellular device configured to receive location data from one or more localized cellular towers. Based on the position data, the computing device 50 may determine a local geographical area (e.g., town, city, state, etc.) of its position.

In some embodiments, the computing device 50 is configured to implement one or more modules or engines, each of which is constructed, programmed, configured, or otherwise adapted, to autonomously carry out a function or set of functions. A module/engine may include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine may be realized in a variety of physically realizable configurations, and should generally not be limited to any particular implementation exemplified herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, it should be understood that in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
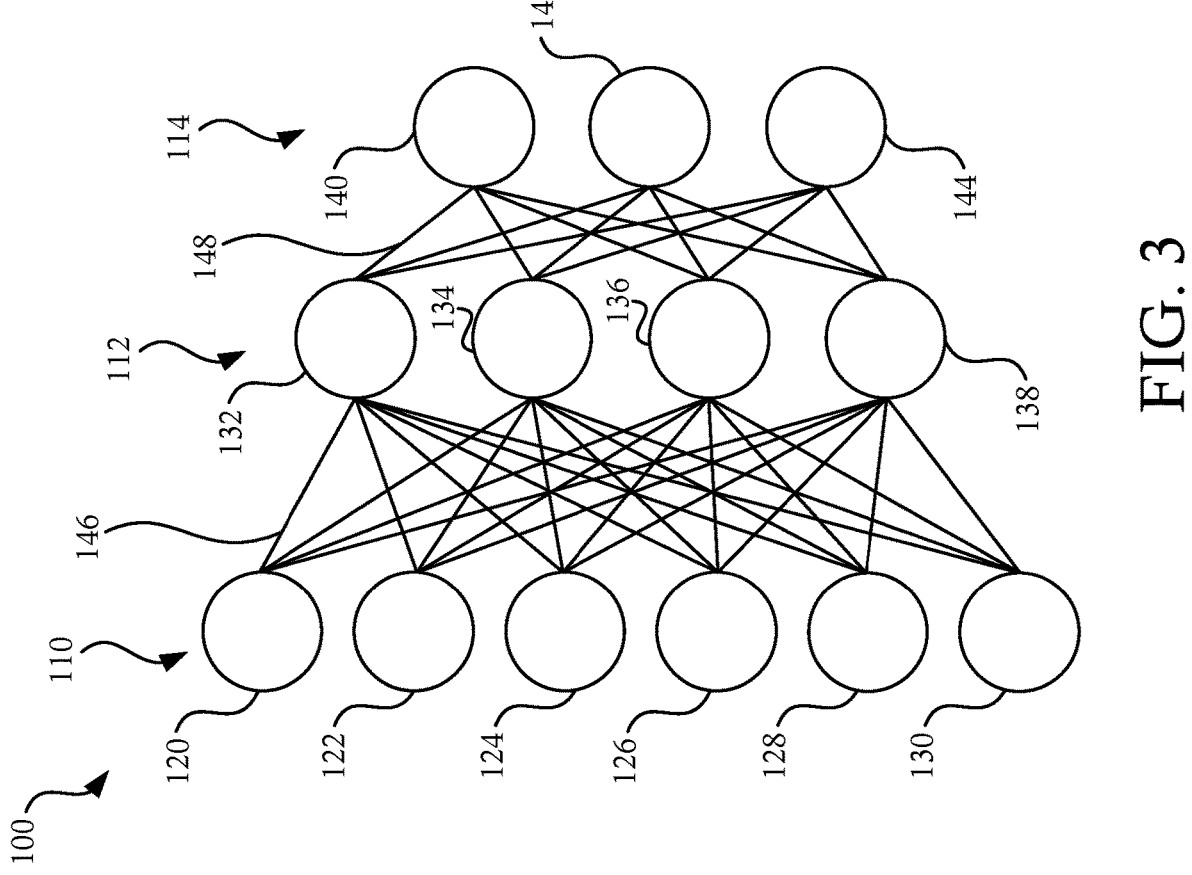
FIG. 3 illustrates an artificial neural network, in accordance with some embodiments.

FIG. 3 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 may be arranged in layers 110-114, wherein the layers may comprise an intrinsic order introduced by the edges 146-148 between the nodes 120-144 such that edges 146-148 exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 may be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number may be assigned as a value to every node 120-144 of the neural network 100. Here, $$x_i^{(n)}$$

denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 may comprise a weight being a real number, in particular, the weight is a real number within the interval $[-1, 1]$, within the interval $[0, 1]$, and/or within any other suitable interval. Here, $$w_{i,j}^{(m,n)}$$

denotes the weight of the edge between the i-th node 120-138 of the m-th layer 110, 112 and the j-th node 132-144 of the n-th layer 112, 114. Furthermore, the abbreviation $$w_{i,j}^{(n)}$$

is defined for the weight $$w_{i,j}^{(n,n+1)}.$$

In particular, to calculate the output values of the neural network 100, the input values are propagated through the neural network. In particular, the values of the nodes 132-144 of the (n+1)-th layer 112, 114 may be calculated based on the values of the nodes 120-138 of the n-th layer 110, 112 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 may be calculated based on the values of the input layer 110 of the neural network and/or based on the values of a prior hidden layer, etc.

In order to set the values $$w_{i,j}^{(m,n)}$$

for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}'^{(n)} = w_{i,j}^{(n)} - \gamma \cdot \delta_j^{(n)} \cdot x_i^{(n)}$$

wherein $\gamma$ is a learning rate, and the numbers $$\delta_j^{(n)}$$

may be recursively calculated as $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

based on $$\delta_j^{(n+1)},$$

if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 114, wherein f' is the first derivative of the activation function, and $$y_j^{(n+1)}$$

is the comparison training value for the j-th node of the output layer 114.

Figure 4:
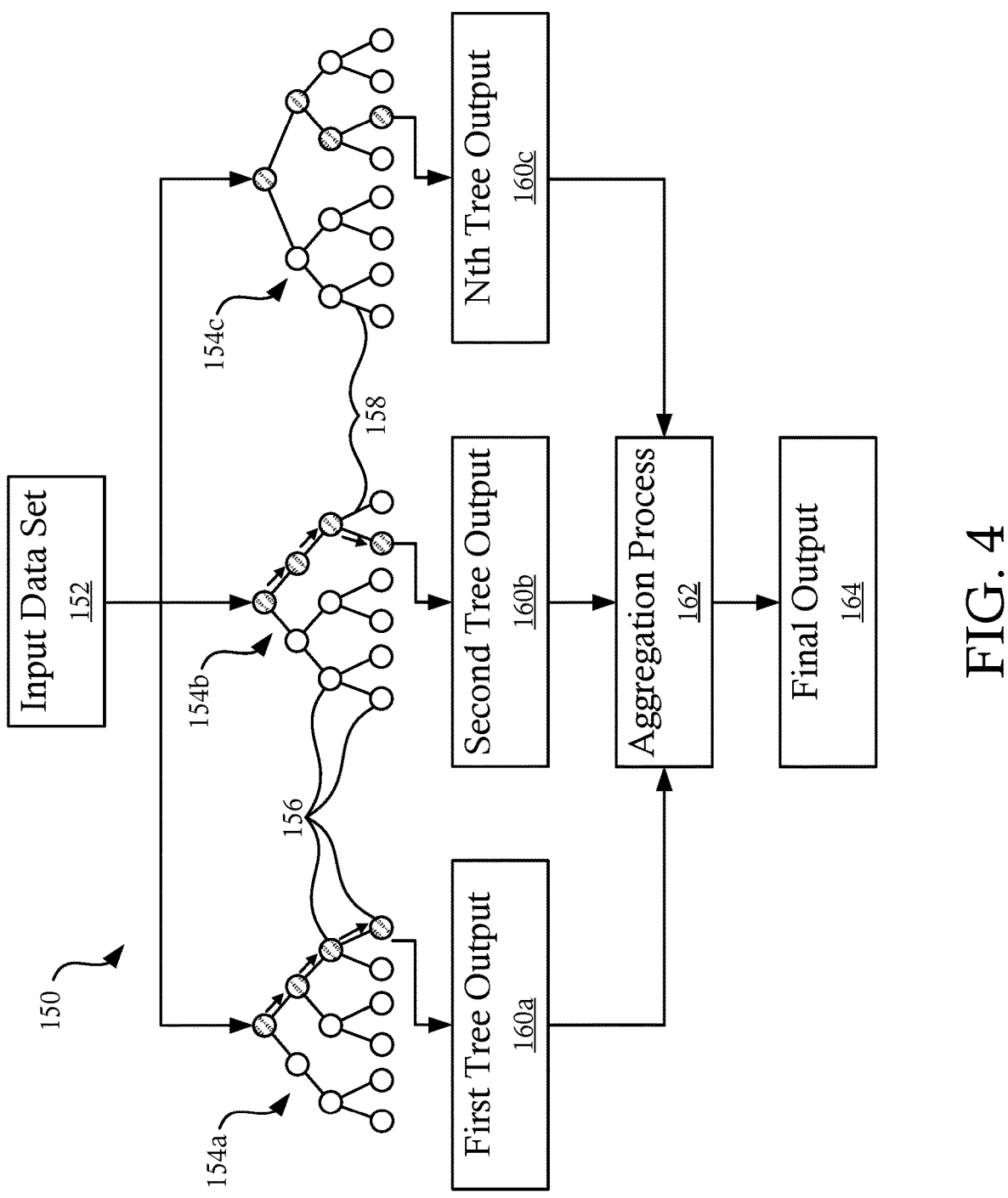
FIG. 4 illustrates a tree-based artificial neural network, in accordance with some embodiments.

FIG. 4 illustrates a tree-based neural network 150, in accordance with some embodiments. In particular, the tree-based neural network 150 is a random forest neural network, though it will be appreciated that the discussion herein is applicable to other decision tree neural networks. The tree-based neural network 150 includes a plurality of trained decision trees 154a-154c each including a set of nodes 156 (also referred to as "leaves") and a set of edges 158 (also referred to as "branches").

Each of the trained decision trees 154a-154c may include a classification and/or a regression tree (CART). Classification trees include a tree model in which a target variable may take a discrete set of values, e.g., may be classified as one of a set of values. In classification trees, each leaf 156 represents class labels and each of the branches 158 represents conjunctions of features that connect the class labels. Regression trees include a tree model in which the target variable may take continuous values (e.g., a real number value).

In operation, an input data set 152 including one or more features or attributes is received. A subset of the input data set 152 is provided to each of the trained decision trees 154a-154c. The subset may include a portion of and/or all of the features or attributes included in the input data set 152. Each of the trained decision trees 154a-154c is trained to receive the subset of the input data set 152 and generate a tree output value 160a-160c, such as a classification or regression output. The individual tree output value 160a-160c is determined by traversing the trained decision trees 154a-154c to arrive at a final leaf (or node) 156.

In some embodiments, the tree-based neural network 150 applies an aggregation process 162 to combine the output of each of the trained decision trees 154a-154c into a final output 164. For example, in embodiments including classification trees, the tree-based neural network 150 may apply a majority-voting process to identify a classification selected by the majority of the trained decision trees 154a-154c. As another example, in embodiments including regression trees, the tree-based neural network 150 may apply an average, mean, and/or other mathematical process to generate a composite output of the trained decision trees. The final output 164 is provided as an output of the tree-based neural network 150.

Figure 5:
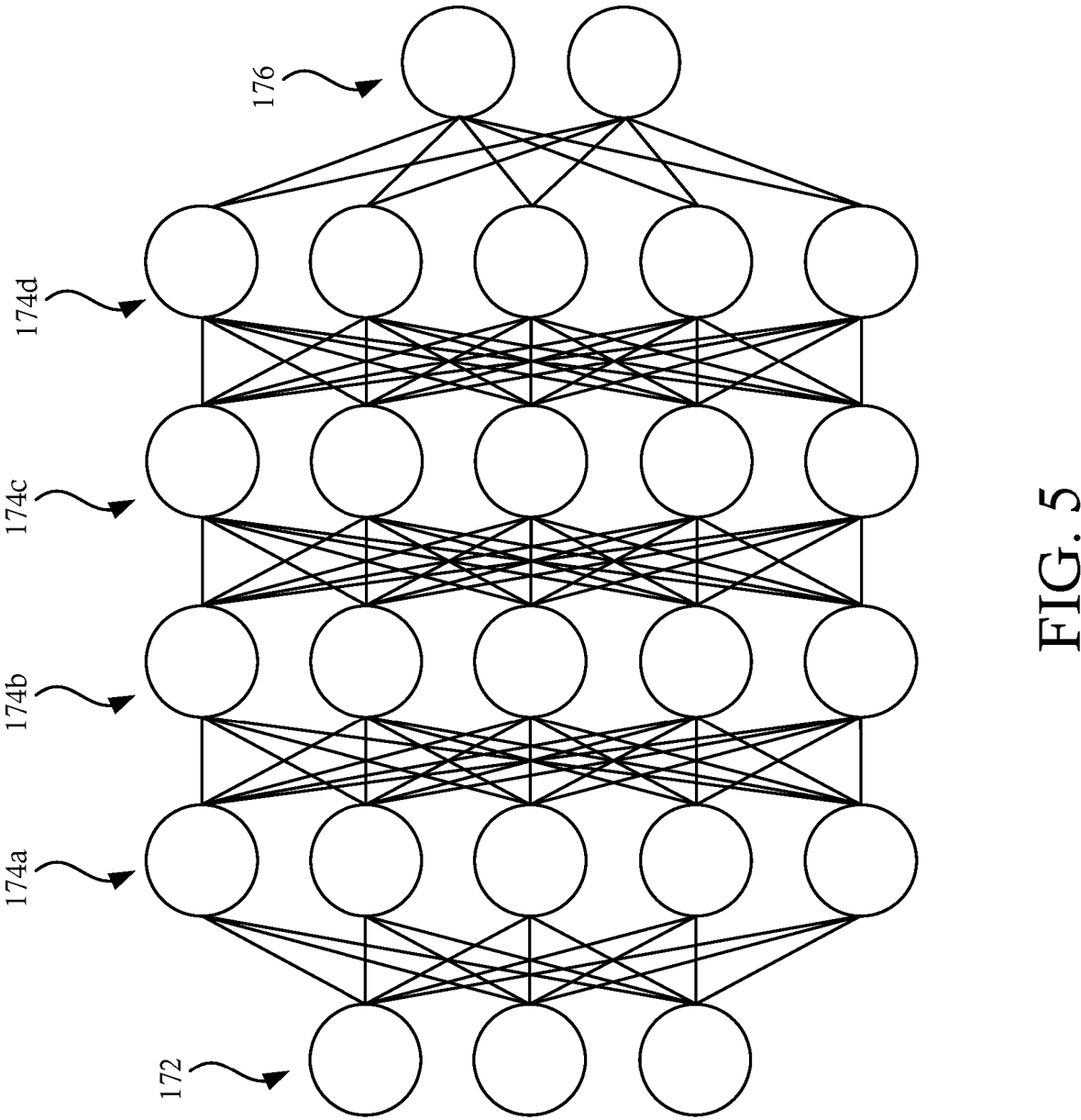
FIG. 5 illustrates a deep neural network (DNN), in accordance with some embodiments.

FIG. 5 illustrates a deep neural network (DNN) 170, in accordance with some embodiments. The DNN 170 is an artificial neural network, such as the neural network 100 illustrated in conjunction with FIG. 3, that includes representation learning. The DNN 170 may include an unbounded number of (e.g., two or more) intermediate layers 174a-174d each of a bounded size (e.g., having a predetermined number of nodes), providing for practical application and optimized implementation of a universal classifier. Each of the layers 174a-174d may be heterogenous. The DNN 170 may be configured to model complex, non-linear relationships. Intermediate layers, such as intermediate layer 174c, may provide compositions of features from lower layers, such as layers 174a, 174b, providing for modeling of complex data.

In some embodiments, the DNN 170 may be considered a stacked neural network including multiple layers each configured to execute one or more computations. The computation for a network with L hidden layers may be denoted as:

$$f(x) = f\left[a^{(L+1)}\left(h^{(L)}\left(a^{(L)}\left(\ldots\left(h^{(2)}\left(a^{(2)}\left(h^{(1)}\left(a^{(1)}(x)\right)\right)\right)\right)\right)\right)\right)\right]$$

where $a^{(l)}(x)$ is a preactivation function and $h^{(l)}(x)$ is a hidden-layer activation function providing the output of each hidden layer. The preactivation function $a^{(l)}(x)$ may include a linear operation with matrix $W^{(l)}$ and bias $b^{(l)}$, where:

$$a^{(l)}(x) = W^{(l)}x + b^{(l)}$$

In some embodiments, the DNN 170 is a feedforward network in which data flows from an input layer 172 to an output layer 176 without looping back through any layers. In some embodiments, the DNN 170 may include a backpropagation network in which the output of at least one hidden layer is provided, e.g., propagated, to a prior hidden layer. The DNN 170 may include any suitable neural network, such as a self-organizing neural network, a recurrent neural network, a convolutional neural network, a modular neural network, and/or any other suitable neural network.

In some embodiments, a DNN 170 may include a neural additive model (NAM). An NAM includes a linear combination of networks, each of which attends to (e.g., provides a calculation regarding) a single input feature. For example, a NAM may be represented as:

$$y = \beta + f_1(x_1) + f_2(x_2) + \ldots + f_K(x_K)$$

where $\beta$ is an offset and each $f_i$ is parametrized by a neural network. In some embodiments, the DNN 170 may include a neural multiplicative model (NMM), including a multiplicative form for the NAM mode using a log transformation of the dependent variable y and the independent variable x:

$$y = e^{\beta} e^{f(\log x)} e^{\Sigma_i f_i^d(d_i)}$$

where d represents one or more features of the independent variable x.

Figure 6:
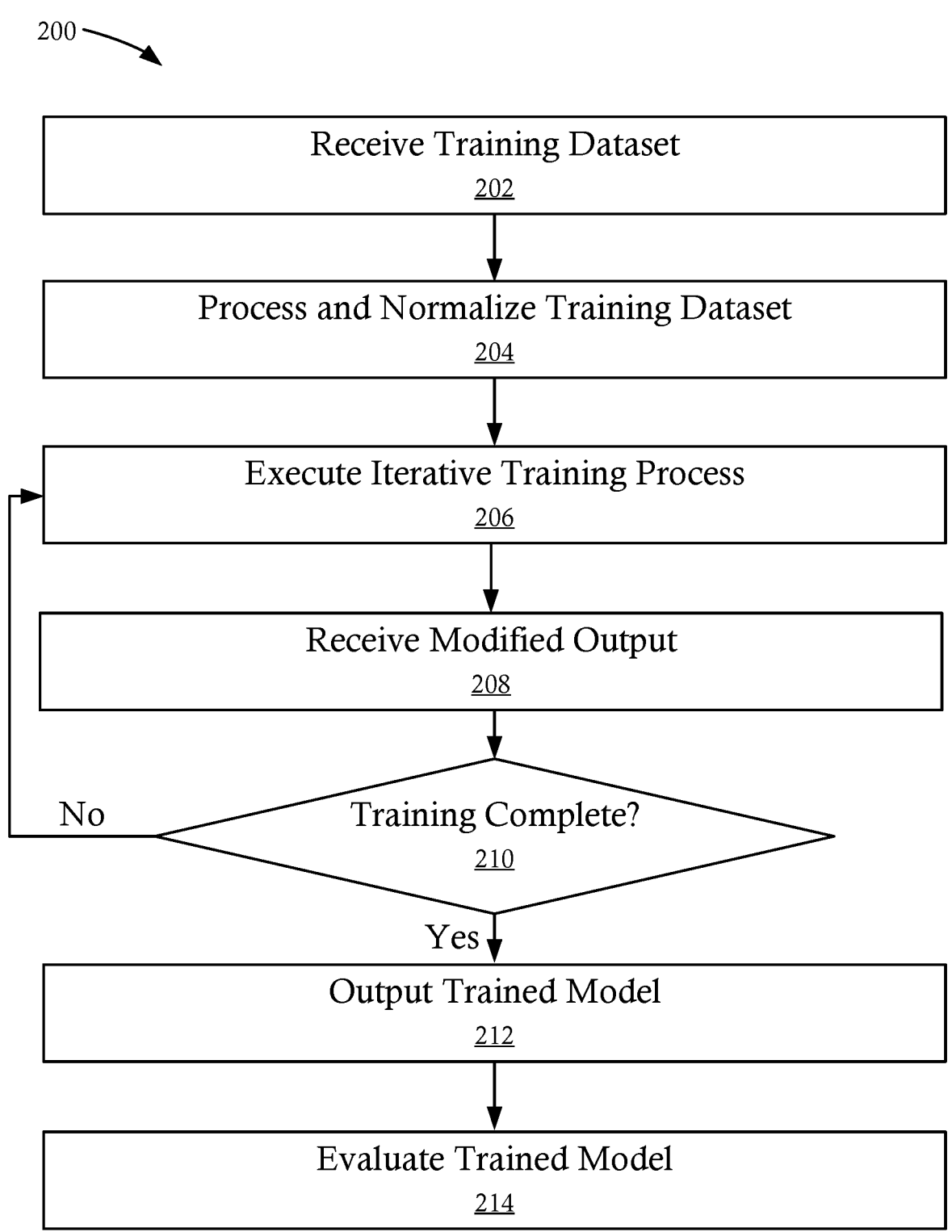
FIG. 6 is a flowchart illustrating a training method for generating a trained machine learning model, in accordance with some embodiments.
Figure 7:
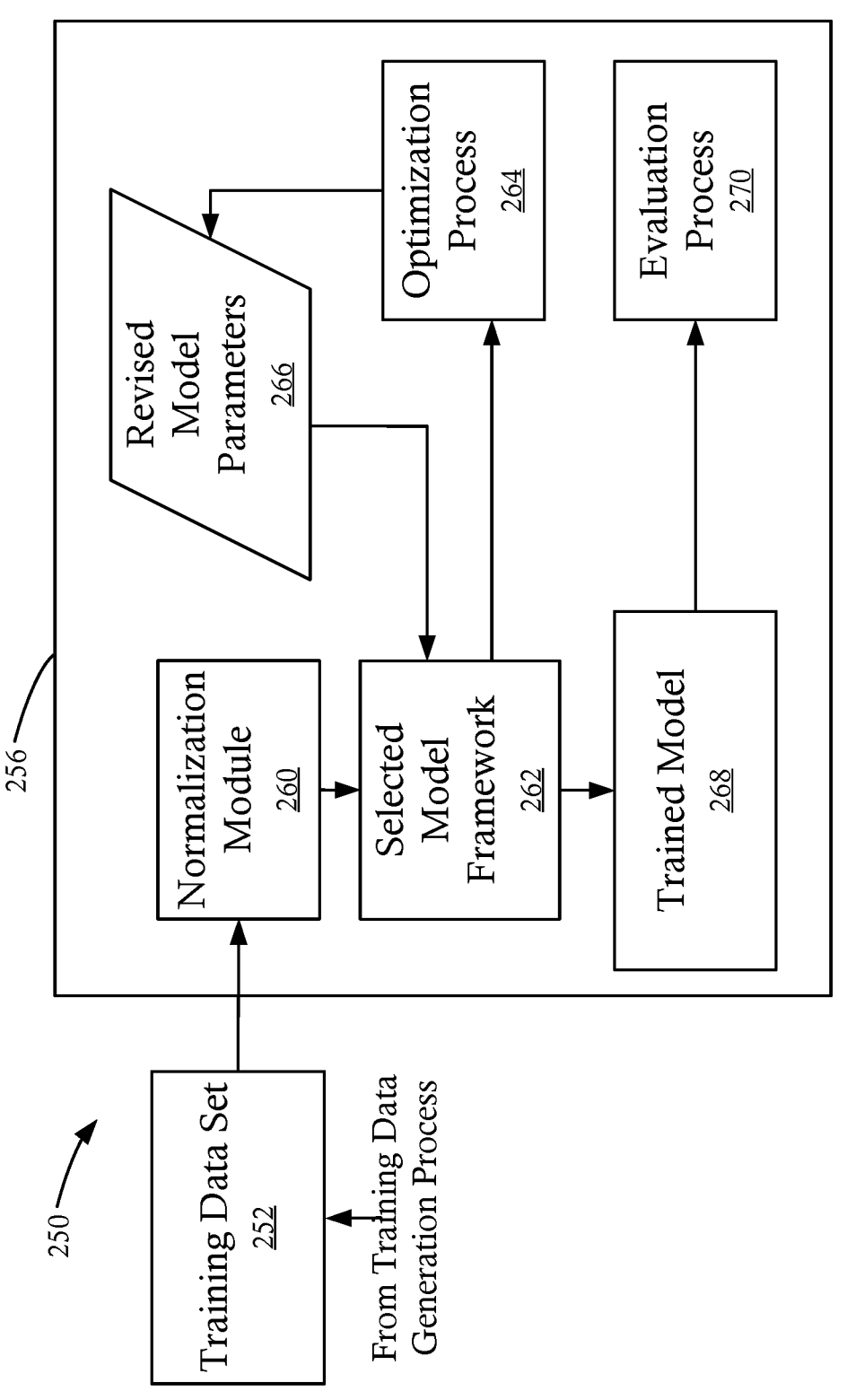
FIG. 7 is a process flow illustrating various steps of the training method of FIG. 6, in accordance with some embodiments.

In some embodiments, a fraud detection computing device 4 can include and/or implement one or more trained models, such as a one or more fraud detection models. In some embodiments, one or more trained models can be generated using an iterative training process based on a training dataset. FIG. 6 illustrates a method 200 for generating a trained model, such as a trained optimization model, in accordance with some embodiments. FIG. 7 is a process flow 250 illustrating various steps of the method 200 of generating a trained model, in accordance with some embodiments. At step 202, a training dataset 252 is received by a system, such as a processing device 10. The training dataset 252 can include labeled and/or unlabeled data. For example, in some embodiments, a set of labeled network interaction data is provided for use in training a model. In some embodiments, the training dataset 252 includes data including labels identifying undesirable network operations at different threshold rates, as discussed in greater detail below.

At optional step 204, the received training dataset 252 is processed and/or normalized by a normalization module 260. For example, in some embodiments, the training dataset 252 can be augmented by imputing or estimating missing values of one or more features associated with a trained fraud detection model. In some embodiments, processing of the received training dataset 252 includes outlier detection configured to remove data likely to skew training of a fraud detection model. In some embodiments, processing of the received training dataset 252 includes removing features that have limited value with respect to training of the fraud detection model.

At step 206, an iterative training process is executed to train a selected model framework 262. The selected model framework 262 can include an untrained (e.g., base) machine learning model, such as a multiclass classification framework (e.g., XGBoost), and/or a partially or previously trained model (e.g., a prior version of a trained model). The training process is configured to iteratively adjust parameters (e.g., hyperparameters) of the selected model framework 262 to minimize a cost value (e.g., an output of a cost function) for the selected model framework 262. In some embodiments, the cost value is related to detection of undesirable network activities based on co-controlled interactions.

The training process is an iterative process that generates set of revised model parameters 266 during each iteration. The set of revised model parameters 266 can be generated by applying an optimization process 264 to the cost function of the selected model framework 262. The optimization process 264 can be configured to reduce the cost value (e.g., reduce the output of the cost function) at each step by adjusting one or more parameters during each iteration of the training process.

After each iteration of the training process, at step 208, a determination is made whether the training process is complete. The determination at step 208 can be based on any suitable parameters. For example, in some embodiments, a training process can complete after a predetermined number of iterations. As another example, in some embodiments, a training process can complete when it is determined that the cost function of the selected model framework 262 has reached a minimum, such as a local minimum and/or a global minimum.

At step 210, a trained fraud detection model 352, such as a trained fraud detection model, is output and provided for use in fraud detection, such as the fraud detection and control method 300 discussed below with respect to FIGS. 8-9. At optional step 212, a trained fraud detection model 352 can be evaluated by an evaluation process 270. A trained model can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained model.

Figure 8:
FIG. 8 is a flowchart illustrating a fraud detection and control method, in accordance with some embodiments.
Figure 8:
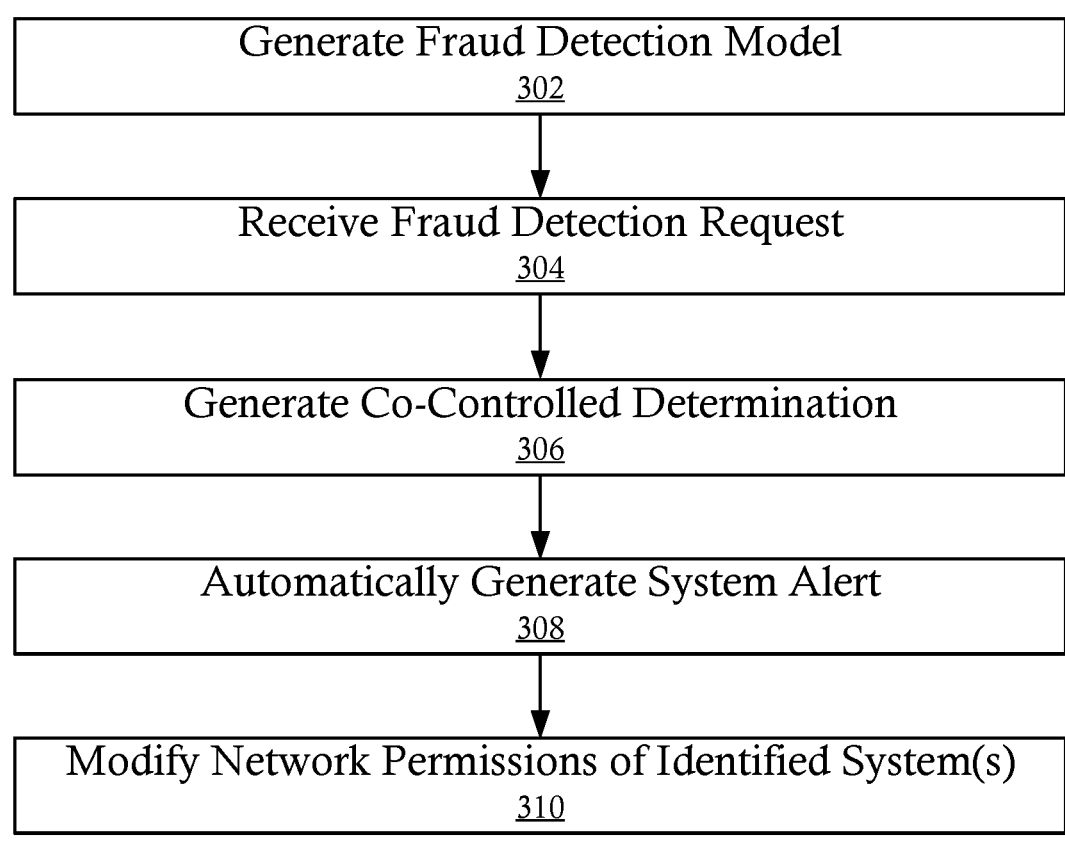
Figure 9:
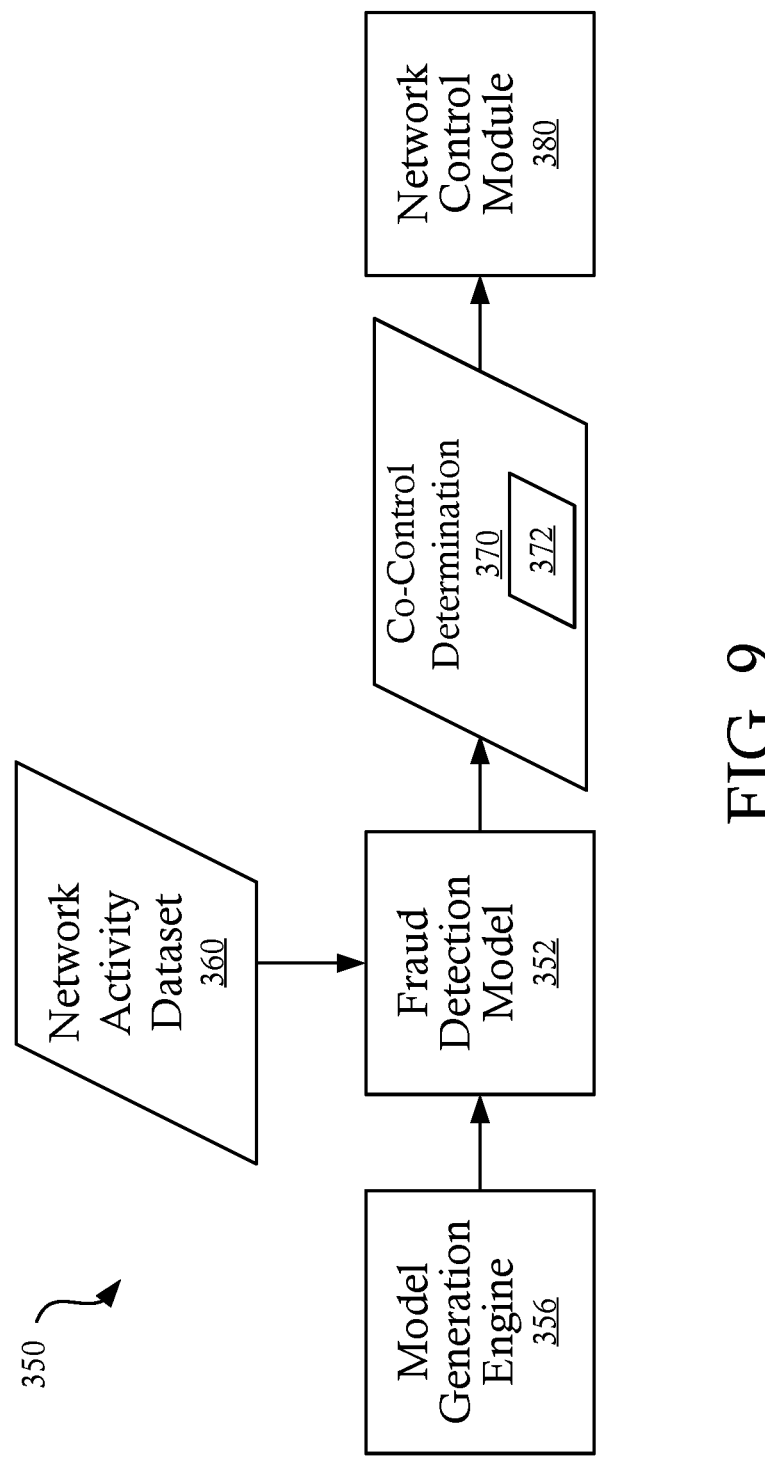
FIG. 9 is a process flow illustrating various steps of the fraud detection and control method of FIG. 8, in accordance with some embodiments.

FIG. 8 is a flowchart illustrating a fraud detection and control method 300, in accordance with some embodiments. FIG. 9 is a process flow 350 illustrating various steps of the fraud detection and control method 300, in accordance with some embodiments. At step 302, a fraud detection model 352 is generated. The fraud detection model 352 includes a trained machine learning model generated via an iterative training process, such as, for example, the iterative training process discussed above with respect to FIGS. 5-6. The fraud detection model 352 is configured to generate a probability (e.g., output score, prediction score, etc.) representative of a likelihood of a selected system (e.g., a first system having a first role or context) being engaged in co-controlled activities (e.g., fraudulent behavior) within a network environment with one or more additional systems.

Figure 10:
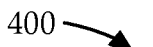
FIG. 10 is a flowchart illustrating a fraud detection model training process, in accordance with some embodiments.
Figure 10:
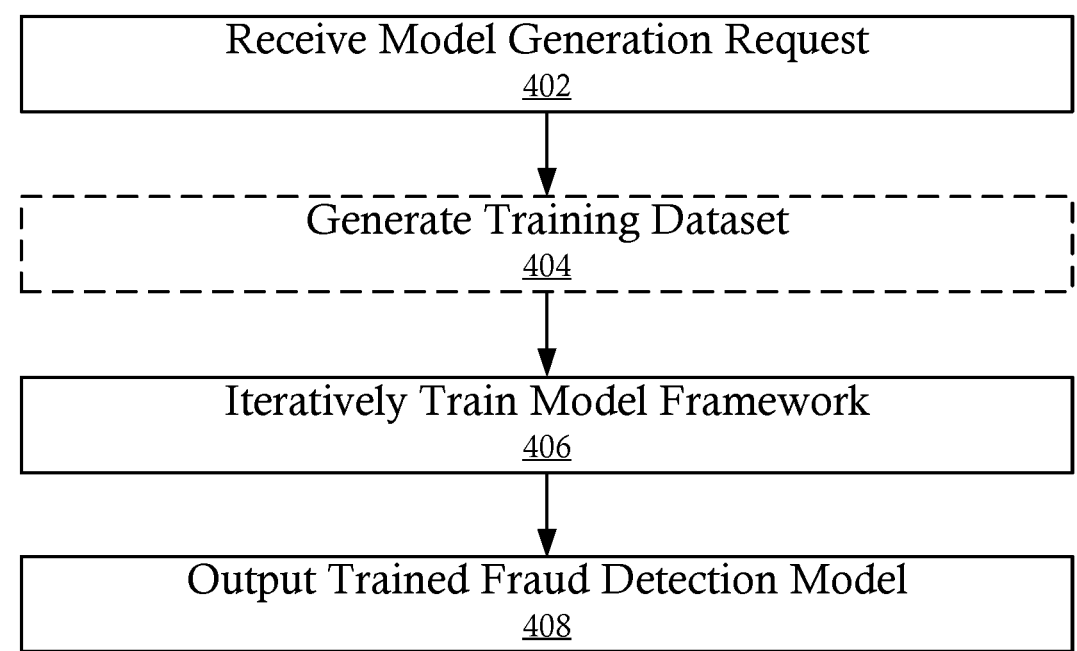
Figure 11:
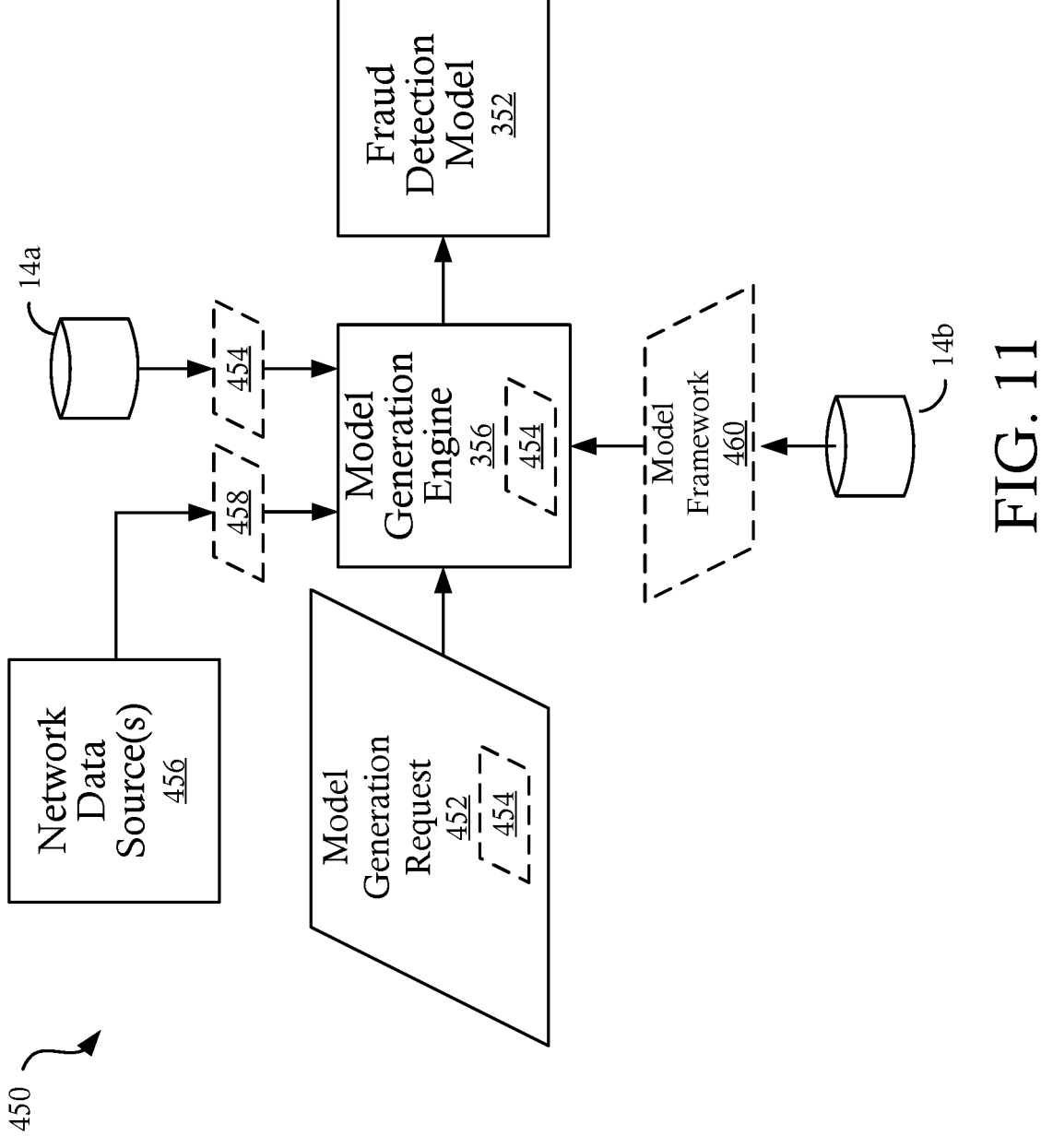
FIG. 11 is a process flow illustrating various steps of the fraud detection model training process of FIG. 10, in accordance with some embodiments.

In some embodiments, the fraud detection model 352 is generated by a model generation process implemented by one or more engines, modules, etc., such as, for example, the model generation engine 356. FIG. 10 is a flowchart illustrating a fraud detection model generation process 400, in accordance with some embodiments. FIG. 11 is a process flow 450 illustrating various steps of the fraud detection model generation process 400, in accordance with some embodiments. At step 402, a model generation trigger 452 is received. The model generation trigger 452 may be generated by and/or received by any suitable system. For example, in some embodiments, a model generation trigger 452 may be generated by a first computing device, such as the fraud detection computing device 4, and received by one or more second computing devices, such as one or more of the processing devices 10. The model generation trigger 452 may include, but is not limited to, a timed trigger (e.g., a trigger generated at a predetermined interval), receipt of a training dataset 454 and/or data that may be potentially incorporated into a training dataset 454, etc. The model generation trigger 452 may be received by an engine, such as a model generation engine 356. The model generation trigger 452 may be generated at a predetermined interval, for example, once a week, once a month, etc., may be generated in response to one or more events, and/or may be generated in response to any suitable input.

At step 404, a training dataset 454 is obtained and/or generated in response to the model generation trigger 452. For example, in some embodiments, the model generation trigger 452 identifies a previously generated training dataset 454, for example via a pointer or other identifier corresponding to a storage location for the previously generated training dataset 454. The storage location may include any suitable data store, such as, for example, a first database 14a (e.g., local database, distributed database, cloud database, etc.). As another example, in some embodiments, the model generation engine 356 (and/or any other suitable engine or module) is configured to receive a set of raw network data 458 from one or more network data source 456 and implement a dataset generation process, as discussed in greater detail below. Although specific embodiments are discussed herein, it will be appreciated that the training dataset 454 may be obtained from and/or generated from data stored at any suitable storage location.

In some embodiments, a dataset generation process is implemented to generate the training dataset 454. The dataset generation process is configured to ingest network data, such as network data 458, representative of one or more network activities (e.g., operations, interactions, etc.) and apply one or more labels to each activity dataset in the network data 458. For example, a dataset generation process may be configured to receive network data 458 representative of historical operation of a corresponding network environment, historical operation of similar network environments, and/or simulated operation of a network environment and apply one or more labels to each activity dataset within the network data 458.

In some embodiments, the model generation engine 356 is configured to apply data blending to generate a training dataset 454. For example, the network data sources 456 may include a plurality of network data sources configured to generate one or more network activity datasets. The model generation engine 356 may be configured to receive network data 458 from each of the network data sources 456 and apply a data blending process to generate a combined network dataset. Data blending may include, but is not limited to, combination of datasets, cleaning of datasets, deduplication of datasets, and/or any other suitable blending process.

In some embodiments, the model generation engine 356 (and/or any other suitable engine, sub-engine, module, sub-module, etc.) is configured to generate a training dataset 454 by identifying and labeling each network activity dataset within the network data 458 with one of a plurality of labels corresponding to one of a predetermined set of behaviors and/or operations performed within and/or in conjunction with the network environment. As one non-limiting example, in the context of an ecommerce network environment, activity datasets may be identified and labeled with one of a plurality of transactional behavior labels such as a chargeback label, seller initiated refund label, lost after delivery refund label, posted review label, price change label, etc. Individual network datasets may be identified and/or labeled by, for example, an automated process implemented by the model generation engine 356 configured to identify specific operations or data elements corresponding to one of the predetermined network (e.g., transactional) behaviors and applying a corresponding label. Although specific embodiments are discussed herein, it will be appreciated that any suitable labels corresponding to co-controlled (e.g., fraudulent) network behavior may be applied utilizing any suitable labeling process and/or mechanism.

In some embodiments, the network data 458 includes one or more features (or variables) representative of links or connections between a system operating in a first role and one or more additional systems within a network environment. For example, each network dataset may include one or more features such as a set of identify features for one or more systems involved in one or more transactions, interactions, or other network activities, transactional features representative of transactional interactions and/or operations (or portions thereof); role features representative of a specific role within the network environment (e.g., in the context of an ecommerce environment, seller, buyer, etc.); and/or any other suitable features.

In some embodiments, the network data 458 may include a first quantity of features and the set of features utilized by a trained fraud detection model 352 after training may include a second quantity, where the second quantity is different than the first quantity. For example, in some embodiments, the set of features included in and/or represented by network datasets within a training dataset 454 may include about 1000 variables. After training, a trained model may utilize a subset of the available variables, e.g., less than 1000, less than 900, less than 800, etc., and/or may apply one or more weights to prioritize certain variables and/or combinations of variables. As another example, in some embodiments, a trained model may be configured to utilize a first set of variables and each of the network datasets may include only a subset of the first set of variables. It will be appreciated that any suitable combination of features and/or variables may be utilized by a trained model and/or provided within a training dataset.

In some embodiments, the network data 458 includes temporal features and/or segmentations corresponding to two or more predefined time periods. For example, a first system within a network environment may perform different roles and/or operations at different times. Each of the network datasets may include multiple features and/or labels for each system corresponding to distinct time periods during operation of the network environment and/or distinct operations of the network environment.

In some embodiments, the network data 458 includes one or more features representative of a role of a system within the network environment. For example, the network data 458 may include one or more features representative of a first role (e.g., in the context of an ecommerce environment, a "seller" role), a second role (e.g., in the context of an ecommerce environment, a "buyer" role), etc. Systems may have designated roles within the network environment, may have assignable roles, and/or may have variable roles determined by the one or more features.

In some embodiments, the network data 458 includes one or more features representative of linkages (e.g., graph linkages) between systems within the network environment. For example, the network data 458 may include one or more features representative of a linkage (e.g., communication, connection, relationships, etc.) between a first system and at least one or more additional systems. In some embodiments, the linkages may include role specific linkages. For example, linkage data may be related to operation of a first system in a first role and one or more additional systems in or more roles (e.g., in the context of an ecommerce environment, role linkages may include, but are not limited to seller-buyer linkages, seller-seller linkages, etc.).

In some embodiments, a network dataset may be generated through simulated operation of a network environment based on an offline graph linkage model. For example, in some embodiments, network interactions and/or activity may be simulated and/or reconstructed through offline graph linkage. Features may be extracted from the offline graph representative of connections (e.g., linkages) between two or more systems. After linkages have been identified and/or determined, the linkage data may be combined with actual and/or simulated network activity data to generate a training dataset for generating a trained fraud detection model 352, as discussed in greater detail below.

At step 406, a trained fraud detection model 352 is generated by iteratively training (e.g., modifying, adjusting, etc.) a model framework 460 to predict a likelihood of one or more network activities being a result of co-controlled network interactions (e.g., fraudulent network behavior). The model framework 460 is trained to identify and/or quantify linkages between a first system having a first role during a network interaction and at least one second system at different touchpoints within the network environment. In some embodiments, the trained fraud detection model 352 is configured to detect co-controlled network interactions (e.g., fraudulent behaviors) with respect to two or more types of network operations or interactions.

As one non-limiting example, in the context of an ecommerce environment, the model framework 460 may be iteratively modified to identify connections and predict a likelihood of co-control for a first system having a first role (e.g., "seller," "source," etc.) and one or more additional systems (e.g., "actors," "buyers," "recipients," etc.) involved in one or more of a chargeback operation, a refund operation, fake reviews, price gauging, etc. The likelihood of an activity being a co-controlled activity may be determined based on one or more features associated with a network activity dataset representative of the activity, such as, for example, features representative of graph linkages between the first system and the one or more additional systems. Although specific embodiments are discussed herein, it will be appreciated a model framework 460 may be iteratively adjusted to predict co-controlled (e.g., fraudulent) behavior with respect to any suitable network operations.

In some embodiments, the model framework 460 includes a multiclass classification framework configured to output a prediction representative of a likelihood of an activity being a co-controlled activity. Multiclass classification frameworks are configured to classify input datasets into at least one of three or more classes (e.g., three classes, four classes, etc.) (as compared to binary classification frameworks configured to classify input datasets into one of two classes). A multiclass classification framework may include any suitable framework, such as, for example, an XGBoost framework, a tree-based framework (e.g., decision tree), a support vector machine framework, a neural network perceptron framework, and/or any other suitable multiclass classification framework.

In some embodiments, the model framework 460 is iteratively trained to include classifications based on and/or adjusted for each of the labels applied to at least one network activity dataset within the training dataset 454. For example, in embodiments including a set of labels corresponding to an ecommerce network (e.g., chargeback, seller initiated delivery refund, etc.), the model framework 460 may be iteratively adjusted to classify a network activity dataset into one of a set of classes (e.g., categories) corresponding to a similar set of labels as those applied to the training dataset 454, such as a fraudulent chargeback, a non-fraudulent chargeback, a fraudulent seller initiated delivery refund, or a non-fraudulent seller initiated delivery refund. In some embodiments, additional and/or alternative labels or categories may be defined. Although specific embodiments are discussed herein, it will be appreciated that any suitable set of categories and/or category labels may be defined during training of the model framework 460.

In some embodiments, the model framework 460 is iteratively trained to output one or more scaled scores. Each of the one or more scaled scores may be representative of a likelihood of network activity being co-controlled network activity. The scaled score may include an aggregated score and/or individual scaled scores. In some embodiments, an individual score is generated for each type of network activity included in the training dataset 454. For example, in an embodiment including a training dataset 454 including chargeback activities and seller-initiated refund activities, individual scores representative of a likelihood of engaging in co-controlled activity may be generated for each of the activity types, e.g., a chargeback fraud likelihood score and a seller-initiated refund fraud likelihood score. Each of the individual scores may be individually scaled for the corresponding fraudulent activity. Scaled scores may be combined to generate a final output score representative of a likelihood of a system engaging in co-controlled (e.g., fraudulent) behavior and/or may be individually output as a likelihood of a system engaging in each of the specifically labeled types of co-controlled behavior.

In some embodiments, the model framework 460 is iteratively adjusted to predict a likelihood of a system (e.g., a first system operating in a first role for one or more network activities) of engaging in co-controlled behavior. For example, the model framework 460 may be iteratively adjusted to receive an input dataset including one or more network activities including the first system and generate one or more scaled scores representative of a likelihood of the first system engaging in co-controlled behaviors with respect to the represented activities. The iterative training process may emphasize and/or deemphasize each of the features associated with the network activity datasets to generate each of the individual and/or aggregate scaled scores.

At step 408, a trained fraud detection model 352 is output. The trained fraud detection model 352 is configured to receive network activity datasets representative of one or more activities, transactions, operations, etc. within a network environment and output a probability that a first system operating in a first role is likely to engage or is engaging in co-controlled behavior. As discussed above, a trained model framework 460 may be configured to identify linkages between systems represented in the network activity datasets and output a probability (e.g., at least one scaled score) of a system engaging in co-controlled network operations.

In some embodiments, the trained fraud detection model 352 outputs at least one scaled score indicating a likelihood of a first system (e.g., a first system associated with a network operation) of engaging in co-controlled behavior and/or of a specific operation being a fraudulent operation. A scaled score may include a score within a predetermined range (e.g., 0-100, 0-1000, etc.) corresponding to a likelihood of one or more types of fraud. In some embodiments, the output of the trained fraud detection model 352 includes one or more reason codes representative of features and/or determinations that resulted in and/or influenced the output score. Although embodiments are discussed herein including a trained fraud detection model 352 applying different thresholds, it will be appreciated that a trained fraud detection model 352 may be configured to output a scaled score and the scaled score may be compared to one or more threshold values by one or more subsequent processes and/or modules. For example, in some embodiments, a comparison model is configured to compare an output of a trained fraud detection model 352 against one or more thresholds to determine whether a system is likely to engage and/or has engaged in co-controlled and/or fraudulent behavior.

In some embodiments, the trained fraud detection model 352 outputs one or more reason codes configured to identify one or more reasons (e.g., logical steps, calculations, determinations, etc.) that led to and/or supported the classification of an input set and/or the output score. For example, the reason codes may be generated using Shapley Additive explanations (SHAP) values. SHAP (or SHAPley) values are utilized to determine a contribution of each contributor to a determined outcome. SHAP provides an interpretability method for determining individual prediction contributions for machine learning models. SHAPley values may provide a modeled explanation, such as a linear model (e.g., an additive feature attribution method) for determining contributions to predicted outcomes of a model, such as the trained fraud detection model 352.

In some embodiments, the trained fraud detection model 352 is configured to apply variable sets of parameters (e.g., lift charts) based on one or more features of an input set, such as, for example, a timestamp identifying one of a plurality of potential time periods corresponding to the operation represented in the input set. For example, as discussed above, the training dataset 454 utilized to generate the trained fraud detection model 352 may include features identifying one of a plurality of timestamps and/or time periods. The trained fraud detection model 352 may utilize different weights for each of the timestamps and/or time periods included in the training dataset 454 and reflected in the trained fraud detection model 352.

In some embodiments, each of the predetermined time periods may apply different thresholds for classification of a network activity dataset into one of the potential categories. For example, a trained fraud detection model 352 may generate a first score for a network activity dataset. The first score may correspond to a first classification, e.g., a likelihood of co-controlled and/or fraudulent behavior, when the operations occur during the first time period but would not correspond to the first classification when the operations occur during a second time period. In some embodiments, the trained fraud detection model 352 may apply a first classification threshold for, a first time period, a second classification threshold for a second time period, etc. In some embodiments, the trained fraud detection model 352 may be configured to apply a different set of weights, hidden layers, etc. for a first time period, a second time period, etc.

The trained fraud detection model 352 may include a batch model configured to operate on batches of input sets at one or more predetermined intervals and/or a real-time model configured to receive input datasets in real-time from the network environments. For example, in some embodiments, the trained fraud detection model 352 includes a batch model configured to operate on batch data at a first interval and a second interval, e.g., twice weekly on two days during the week. A trained fraud detection model 352 may be integrated into an automated data pipeline configured to provide input datasets, collect output determinations, and perform additional operations based on the output of the trained fraud detection model 352.

With reference again to FIGS. 8-9, at step 304, a network activity dataset 360 is received. The network activity dataset 360 may include and/or identify a dataset representative of one or more operations performed on and/or in conjunction with a network environment. The network activity dataset 360 may include a dataset corresponding to a set of operations related to at least one system operating in a first role and at least one secondary system within a network environment and/or may include batch data corresponding to multiple sets of operations related to two or more potential systems operating in a first role and at least one secondary system within a network environment.

At step 306, a fraud determination 370 is generated for at least one target system based on the received network activity dataset 360. For example, in some embodiments, a trained fraud detection model 352 is configured to receive the network activity dataset 360 and generate a fraud determination 370 (e.g., a scaled output score) representative of a probability that a first system is engaging or likely to engage in co-controlled and/or fraudulent behavior with one or more secondary systems in the network environment. The fraud detection model 352 may include any suitable model framework, such as, for example, a multiclass classification framework as discussed above with respect to FIG. 10.

In some embodiments, the fraud determination 370 includes one or more reason codes 372. The reason codes 372 are configured to identify one or more reasons (e.g., logical steps, calculations, determinations, etc.) that resulted in and/or supported the fraud determination 370 generated by the fraud detection model 352. For example, as discussed above, reason codes 372 may be generated using SHAPley values to provide a modeled explanation for determining contributions to predicted outcomes of the trained fraud detection model 352.

At step 308, one or more electronic alerts are automatically generated when a probability score is above one or more predetermined thresholds, e.g., when a first system is classified and/or identified as a system likely to engage or having engaged in co-controlled and/or fraudulent behavior. An electronic alert may be generated by any suitable system, engine, module, etc., such as, for example, a network control module 380. The network control module 380 may be configured to generate an alert, provide the alert to one or more additional processes (as discussed below), and/or transmit the alert to one or more additional systems. The alert my include a standardized and/or programmatically generated alert.

At step 310, the network permissions of a system (e.g., the ability to perform certain operations and/or interactions) having a fraud determination 370 greater than (or equal to) a predetermined threshold, e.g., a system predicted to engage in co-controlled behavior (referred to herein as a "co-controlled system"), are modified. In some embodiments, the network environment may restrict a co-controlled system from one or more operations related to the identified and/or predicted co-controlled behavior. For example, in the context of an ecommerce environment, a co-controlled system may be limited from performing operations related to potentially fraudulent activities, such as chargeback activities. Network permissions may be modified by and/or requested by one or more modules configured to control access to and/or interactions through the network environment, such as, for example, a network control module 380. Although specific embodiments are discussed herein, it will be appreciated that any suitable activity restrictions may be enforced by a network environment against a co-controlled system.

It will be appreciated that identification of co-controlled systems within a network environment, as disclosed herein, particularly within large networks such as ecommerce networks, is only possible with the aid of computer-assisted machine-learning algorithms and techniques, such as the disclosed fraud detection models. In some embodiments, machine learning processes including trained fraud detection models are used to perform operations that cannot practically be performed by a human, either mentally or with assistance, such as generation and identification of graph linkages between two or more systems based on features of one or more network interactions. It will be appreciated that a variety of machine learning techniques can be used alone or in combination to generate trained fraud detection models configured to identify co-controlled interactions within a network environment.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
    a processor; and
    a non-transitory memory storing instructions that, when executed, cause the processor to:
        receive a network activity dataset comprising data representative of network activity within a network environment that includes transactional behaviors for one or more interactions or operations within the network environment or time features representative of a time period for a corresponding interaction or operation;
        identify at least one co-controlled system in the network activity dataset by implementing a trained fraud detection model that receives the network activity dataset and output a fraud determination for each system having at least a first role in the network activity data, wherein the fraud determination represents a likelihood of a system having the first role engaging in a co-controlled network activity; and
        in response to identifying the at least one co-controlled system, modify one or more permissions of the at least one co-controlled system for operating within the network environment by limiting the at least one co-controlled system from performing one or more network activities in the network activity dataset.

2. The system of claim 1, wherein the trained fraud detection model is generated by an iterative training process that receives a model framework and a training dataset.

3. The system of claim 2, wherein the training dataset comprises a labeled dataset generated by applying one of a plurality of labels to one or more activities represented in the training dataset.

4. The system of claim 1, wherein the trained fraud detection model comprises a multiclass classification model.

5. The system of claim 4, wherein the multiclass classification model comprises an XGBoost framework.

6. The system of claim 1, wherein the network activity dataset includes at least one feature representative of a time period for one or more corresponding activities, and wherein the trained fraud detection model applies a first threshold for classification of the at least one co-controlled system for a first time period and a second threshold for classification of the at least one co-controlled system for a second time period.

7. The system of claim 1, wherein the output of the trained fraud detection model is representative of a predicted likelihood of each system engaging in one of a plurality of co-controlled activities.

8. The system of claim 1, wherein the output of the trained fraud detection model includes at least one reason code.

9. The system of claim 8, wherein the at least one reason code comprises a Shapley Additive explanations (SHAP) value.

10. A computer-implemented method, comprising:
receiving a network activity dataset comprising data representative of network activity within a network environment that includes transactional behaviors for one or more interactions or operations within the network environment or time features representative of a time period for a corresponding interaction or operation;
identifying at least one co-controlled system in the network activity dataset by implementing a trained fraud detection model configured to receive the network activity dataset and output a fraud determination for each system having at least a first role in the network activity data, wherein the fraud determination represents a likelihood of a system having the first role engaging in a co-controlled network activity; and
in response to identifying the at least one co-controlled system, modifying one or more permissions of the at least one co-controlled system for operating within the network environment by limiting the at least one co-controlled system from performing one or more network activities in the network activity dataset.

11. The computer-implemented method of claim 10, wherein the trained fraud detection model is generated by an iterative training process configured to receive a model framework and a training dataset.

12. The computer-implemented method of claim 11, wherein the training dataset comprises a labeled dataset generated by applying one of a plurality of labels to one or more activities represented in the training dataset.

13. The computer-implemented method of claim 10, wherein the trained fraud detection model comprises a multiclass classification model.

14. The computer-implemented method of claim 13, wherein the multiclass classification model comprises an XGBoost framework.

15. The computer-implemented method of claim 10, wherein the network activity dataset includes at least one feature representative of a time period for one or more corresponding activities, and wherein the trained fraud detection model is configured to apply a first threshold for classification of each system for a first time period and a second threshold for classification of each system for a second time period.

16. The computer-implemented method of claim 10, wherein the output of the trained fraud detection model is representative of a predicted likelihood of each system engaging in one of a plurality of co-controlled activities.

17. The computer-implemented method of claim 10, wherein the output of the trained fraud detection model includes at least one reason code.

18. The computer-implemented method of claim 17, wherein the at least one reason code comprises a Shapley Additive explanations (SHAP) value.

19. A non-transitory computer readable medium having instructions stored thereon, wherein the instructions, when executed by at least one processor, cause at least one device to perform operations comprising:
training a fraud detection model to receive an input dataset representative of network activity and output a fraud determination for each system having at least a first role in the input dataset representative of network activity, wherein the input dataset includes transactional behaviors for one or more interactions or operations within a network environment or at least one feature representative of a time period for one or more corresponding interactions or operations, and wherein the trained fraud detection model that applies a first threshold for classification of each system for a first time period and a second threshold for classification of each system for a second time period, wherein the output of the trained fraud detection model is representative of a predicted likelihood of each system engaging in one of a plurality of co-controlled activities;
receiving a network activity dataset for the network environment;
identifying at least one co-controlled system in the network activity dataset by providing the network activity dataset to the trained fraud detection model, wherein the trained fraud detection model that generates the fraud determination for each system in the network activity dataset; and
in response to identifying the at least one co-controlled system, modifying one or more permissions of the at least one co-controlled system for operating within the network environment by limiting the at least one co-controlled system from performing one or more network activities in the network activity dataset.

20. The non-transitory computer readable medium of claim 19, wherein the output of the trained fraud detection model includes at least one reason code.

* * * * *